(12) United States Patent
Shi et al.

(10) Patent No.: US 12,111,151 B1
(45) Date of Patent: Oct. 8, 2024

(54) METHOD AND DEVICE FOR GENERATING TRAJECTORY DIAGRAM

(71) Applicant: NORTHWEST INSTRUMENT INC., Dover, NJ (US)

(72) Inventors: Xin Shi, Shanghai (CN); Wei Huang, Shanghai (CN)

(73) Assignee: NORTHWEST INSTRUMENT INC., Dover, NJ (US)

( * ) Notice: Subject to any disclaimer, the term of this patent is extended or adjusted under 35 U.S.C. 154(b) by 0 days.

(21) Appl. No.: 18/534,198

(22) Filed: Dec. 8, 2023

(30) Foreign Application Priority Data

Nov. 20, 2023 (CN) .......................... 202311555131.1

(51) Int. Cl.
| G01B 5/004 | (2006.01) |
| G01B 3/12 | (2006.01) |
| G01B 5/24 | (2006.01) |

(52) U.S. Cl.
CPC ............... *G01B 5/004* (2013.01); *G01B 3/12* (2013.01); *G01B 5/24* (2013.01)

(58) Field of Classification Search
CPC ............. G01B 5/004; G01B 3/12; G01B 5/24
See application file for complete search history.

(56) References Cited

U.S. PATENT DOCUMENTS

| 6,725,553 | B2 | 4/2004 | Airey et al. | |
| 10,473,473 | B2* | 11/2019 | Shi | ...................... G01C 21/3688 |
| 11,243,309 | B2* | 2/2022 | Shi | ........................ G06T 11/203 |
| 2022/0107167 | A1* | 4/2022 | Zeller | ...................... G01B 5/20 |
| 2022/0146279 | A1* | 5/2022 | Shi | ........................... G01C 9/02 |

FOREIGN PATENT DOCUMENTS

CN           109883321  A         6/2019

\* cited by examiner

*Primary Examiner* — Yaritza Guadalupe-McCall
(74) *Attorney, Agent, or Firm* — ANOVA LAW GROUP, PLLC (57) ABSTRACT

A trajectory generation method includes: obtaining distance information which a ranging apparatus has traveled; obtaining, from a sensor system, first angle information and second angle information corresponding to the ranging apparatus when the ranging apparatus is traveling in a space; determining a plurality of target sample points for a trajectory diagram of the space, and generating the trajectory diagram by connecting the plurality of target sampling points. Determining the target sample points includes: using a candidate sample point as one of the plurality of target sample points; in response to a trajectory adjustment condition not being satisfied, determining coordinates of the candidate sample point based on the distance information and the first angle information; and in response to the trajectory adjustment condition being satisfied, adjusting the candidate sample point based on the distance information, the first angle information, and the second angle information.

20 Claims, 5 Drawing Sheets

```
┌─────────────────────────────────────────────────────────────────┐
│ Obtaining distance information which a ranging apparatus has traveled S302 │
└─────────────────────────────────────────────────────────────────┘
                                 │
┌─────────────────────────────────────────────────────────────────┐
│ Obtaining, by a sensor system, first angle information and second angle │
│ information corresponding to the ranging apparatus when the ranging │
│                 apparatus is traveling S304                     │
└─────────────────────────────────────────────────────────────────┘
                                 │
┌─────────────────────────────────────────────────────────────────┐
│ Determining a plurality of target sample points for a trajectory diagram │
│                              S306                               │
├─────────────────────────────────────────────────────────────────┤
│ Using a candidate sample point as one of the plurality of target sample │
│ points, the candidate sampling point being defined by a distance value │
│  obtained from the distance information and an angle value obtained │
│            from the first angle information S3062              │
└─────────────────────────────────────────────────────────────────┘
                                 │
                  Is a trajectory adjustment condition satisfied
              according to the second angle information S3064
           No                                       Yes
┌──────────────────────────────┐   ┌──────────────────────────────┐
│  Determining coordinates of  │   │     Adjusting the candidate  │
│  the candidate sample point  │   │  sample point based on the   │
│    based on the distance     │   │ distance information, the first │
│  information and the first   │   │   angle information, and the │
│  angle information S3066     │   │    second angle information  │
│                              │   │             S3068            │
└──────────────────────────────┘   └──────────────────────────────┘
                                 │
┌─────────────────────────────────────────────────────────────────┐
│ Generating the trajectory diagram by connecting the plurality of target │
│                    sampling points S308                         │
└─────────────────────────────────────────────────────────────────┘
```

METHOD AND DEVICE FOR GENERATING TRAJECTORY DIAGRAM

CROSS REFERENCE TO RELATED APPLICATION

This application claims priority to Chinese Patent Application No. 202311555131.1, filed with the China National Intellectual Property Administration (CNIPA) on Nov. 20, 2023, the entire contents of which are incorporated herein by reference.

TECHNICAL FIELD

The present disclosure relates to the field of surveying and mapping, and more particularly, to a method and device for generating a trajectory diagram.

BACKGROUND

Currently, people use ranging devices to measure and plan routes and the area in all aspects of life and work, such as in the field of construction, road engineering, transportation, pipeline laying, landscape areas etc. An example ranging device is a measuring wheel.

The basic principle of a measuring wheel is to calculate a number of rotations based on the rolling of the measuring wheel and with the help of mechanical gear counter or electronic counter, so as to realize distance measurement. A typical measuring wheel only measures a length of a traveling trajectory between two points. Afterwards, trajectory diagram is created segment by one segment. However, the accuracy of the measuring wheel and the trajectory diagram generated based on data from the measuring wheel needs to be improved.

SUMMARY

In one aspect of the present disclosure, a trajectory generation method is provided. The method includes: obtaining distance information which a ranging apparatus has traveled; obtaining, from a sensor system, first angle information and second angle information corresponding to the ranging apparatus when the ranging apparatus is traveling in a space; determining a plurality of target sample points for a trajectory diagram of the space, and generating the trajectory diagram by connecting the plurality of target sampling points. Determining the target sample points includes: using a candidate sample point as one of the plurality of target sample points, the candidate sampling point being defined by a distance value obtained from the distance information and an angle value obtained from the first angle information; in response to a trajectory adjustment condition not being satisfied, determining coordinates of the candidate sample point based on the distance information and the first angle information; and in response to the trajectory adjustment condition being satisfied, adjusting the candidate sample point based on the distance information, the first angle information, and the second angle information.

In another aspect of the present disclosure, a trajectory generation apparatus is provided. The apparatus includes: at least one memory storing a computer program and at least one processor coupled to the at least one memory. The at least one processor is configured to execute the computer program and perform: obtaining distance information which a ranging apparatus has traveled; obtaining, from a sensor system, first angle information and second angle information corresponding to the ranging apparatus when the ranging apparatus is traveling in a space; determining a plurality of target sample points for a trajectory diagram of the space, and generating the trajectory diagram by connecting the plurality of target sampling points. Determining the target sample points includes: using a candidate sample point as one of the plurality of target sample points, the candidate sampling point being defined by a distance value obtained from the distance information and an angle value obtained from the first angle information; in response to a trajectory adjustment condition not being satisfied, determining coordinates of the candidate sample point based on the distance information and the first angle information; and in response to the trajectory adjustment condition being satisfied, adjusting the candidate sample point based on the distance information, the first angle information, and the second angle information.

The above aspects will be made clear by the following detailed description and accompanying drawings.

BRIEF DESCRIPTION OF THE DRAWINGS

In order to more clearly illustrate the technical solutions in the embodiments of the present disclosure, the drawings used in the description of the embodiments will be briefly described below. The drawings in the following description are only some embodiments of the present disclosure. Other drawings may be obtained by those of ordinary skill in the art based on these drawings.

DETAILED DESCRIPTION

The technical solutions according to the embodiments of the present disclosure is described in the following with reference to the accompanying drawings. The implementation manners described in the following exemplary embodiments do not represent all embodiments of the present disclosure. Instead, they are merely examples of devices and methods consistent with aspects provided by the present disclosure as detailed in the claims. All other embodiments obtained by a person of ordinary skill in the art based on the embodiments of the present disclosure without creative efforts are within the scope of the present disclosure.

In the present disclosure, relational terms such as "first" and "second" are used merely to distinguish one entity or operation from another entity or operation, and do not necessarily require or imply actual relationship or order between these entities or operations. The terms "comprise", "include", or any other variations intended to cover a non-exclusive inclusion, such that a process, method, article, or device that having a plurality of elements, include not only those elements but also other items not specifically listed elements, or elements that are inherent to such a process, method, item, or device. Unless otherwise limited, an element that is defined by the phrase "comprising a . . . " does not exclude the presence of additional equivalent elements in the process, method, item, or device that comprises the element.

The present disclosure provides a method and apparatus for trajectory processing. Multiple trajectories may be obtained from any suitable means, such as a ranging system. The trajectories may be processed to obtain desired information for display. User interactions may be detected to obtain requirements and instructions for processing the trajectories and presenting desired information based on a processing result.

Figure 1:
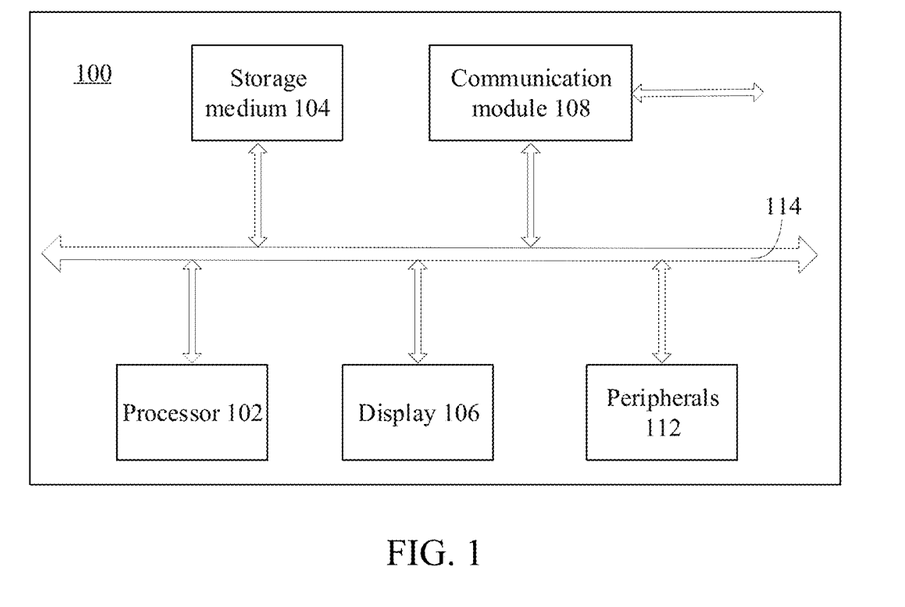
FIG. 1 is a block diagram of an exemplary computing system according to some embodiments of the present disclosure.

FIG. 1 is a block diagram of an exemplary computing system/apparatus capable of implementing the disclosed trajectory generation method according to some embodiments of the present disclosure. As shown in FIG. 1, computing system 100 may include a processor 102 and a storage medium 104. According to certain embodiments, the computing system 100 may further include a display 106, a communication module 108, additional peripheral devices 112, and one or more bus 114 to couple the devices together. Certain devices may be omitted and other devices may be included. According to certain embodiments, the apparatus may be a smart cellphone, a tablet, a computer, or a handheld equipment.

Processor 102 may include any appropriate processor(s). In certain embodiments, processor 102 may include multiple cores for multi-thread or parallel processing, and/or graphics processing unit (GPU). Processor 102 may execute sequences of computer program instructions to perform various processes, such as trajectory processing and generation, responding to interactions on graphical user interface, etc. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 104 may store computer programs for implementing various processes, when executed by processor 102. Storage medium 104 may also include one or more databases for storing certain data such as trajectory processing and generation algorithm program, geographical map data, and certain operations can be performed on the stored data, such as database searching and data retrieving.

The communication module 108 may include network devices for establishing connections through a network. Display 106 may include any appropriate type of computer display device or electronic device display (e.g., CRT or LCD based devices, touch screens). Peripherals 112 may include additional I/O devices, such as a keyboard, a mouse, and so on.

In operation, the processor 102 may be configured to execute instructions stored on the storage medium 104 and perform various operations related to a trajectory processing and generation method as detailed in the following descriptions.

Figure 2:
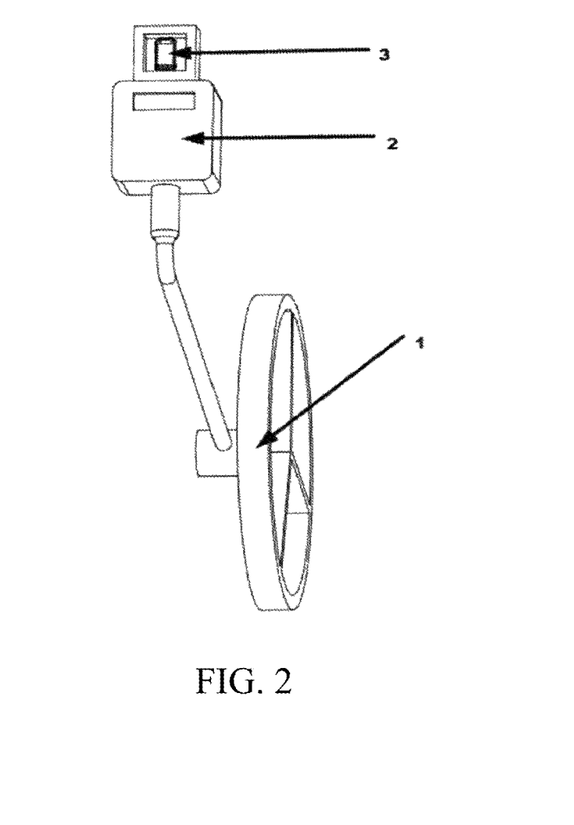
FIG. 2 is a schematic structural view of a ranging system according to an embodiment of the present disclosure.

FIG. 2 is a schematic structural view of a ranging system according to an embodiment of the present disclosure. The ranging system may be used to retrieve one or more trajectories to be processed. The computer system 100 configured to process the trajectory data may be a part of the ranging system or an individual apparatus that does not necessarily have ranging capabilities.

As shown in FIG. 2, an example ranging system may include a ranging apparatus, an angle sensor disposed in a terminal device 3 or in the ranging apparatus, and a processor. The terminal device 3 may be implemented by the computing system 100 and configured to execute the disclosed trajectory processing method. The ranging apparatus includes a measuring wheel, a rotating shaft disposed on the measuring wheel 1, and an electronic counter 2 connected to the rotating shaft and configured to obtain distance information (e.g., in real time) of a route which the measuring wheel has traveled. The angle sensor is configured to obtain angle information in real time. The processor is configured to generate a traveling trajectory diagram of the measuring wheel based on the distance information from the electronic counter and the angle information from the angle sensor, and perform optimization processing on the traveling trajectory to generate an optimized trajectory diagram.

In some embodiments, the processor is coupled to the ranging apparatus and can obtain the distance information directly from the electronic counter. For example, the processor may be disposed on a rotating shaft, a measuring wheel, or a holder of the ranging apparatus. When angle sensor is also resided in the ranging apparatus, the processor may also obtain the angle information from the angle sensor directly. When the angle sensor is not in the ranging apparatus, the processor is configured to obtain the angle information from the angle sensor via a communication module.

In some other embodiments, the processor is resided in a terminal device capable of communicating with the ranging apparatus. In one embodiment, the terminal device may be in a proximity of the ranging apparatus during a ranging session, such as carried by a staff operating the ranging apparatus, fixed on the ranging apparatus through a device holder. For example, the terminal device may communicate with the ranging apparatus in real time as the ranging apparatus is collecting distance information. Alternatively, in another embodiment, the terminal device may not be present during the ranging session, and may communicate with the ranging apparatus after the ranging apparatus has completed the ranging session. In one example, the ranging apparatus may store the distance information and the angle information recorded in a field (e.g., a target physical scene) and later transmit the stored information to the terminal device at another site (e.g., in an office). In another example, the angle sensor may store the angle information in a storage medium, and the processor of the terminal device may obtain angle information from the storage medium.

In certain embodiments, the ranging apparatus may be equipped with an angle sensor. In certain other embodiments, the angle sensor may be arranged on the terminal device. For example, in certain embodiments of the present disclosure, the angle sensor may be an electronic compass disposed in the ranging apparatus and connected to the communication module of the ranging apparatus. In certain other embodiments the angle sensor may be a gyroscope disposed in the terminal device and connected to the communication module. In some embodiments, the ranging system may include multiple angle sensors, such as one or more gyroscopes, one or more accelerometers, and one or more magnetometers, etc.

Figure 4:
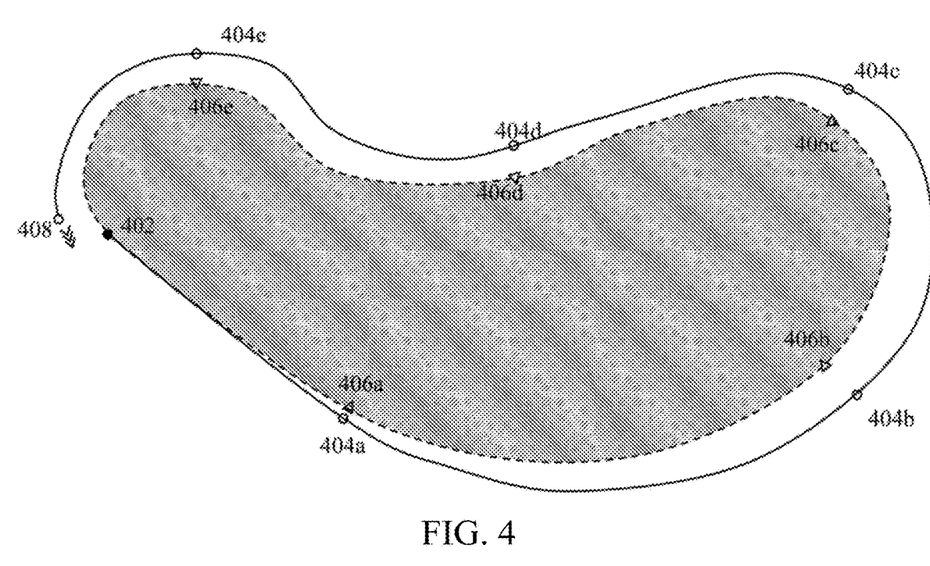
FIG. 4 is a schematic drawing illustrating an adjustment of a trajectory diagram based on reference input according to an embodiment of the present disclosure.
Figure 5:
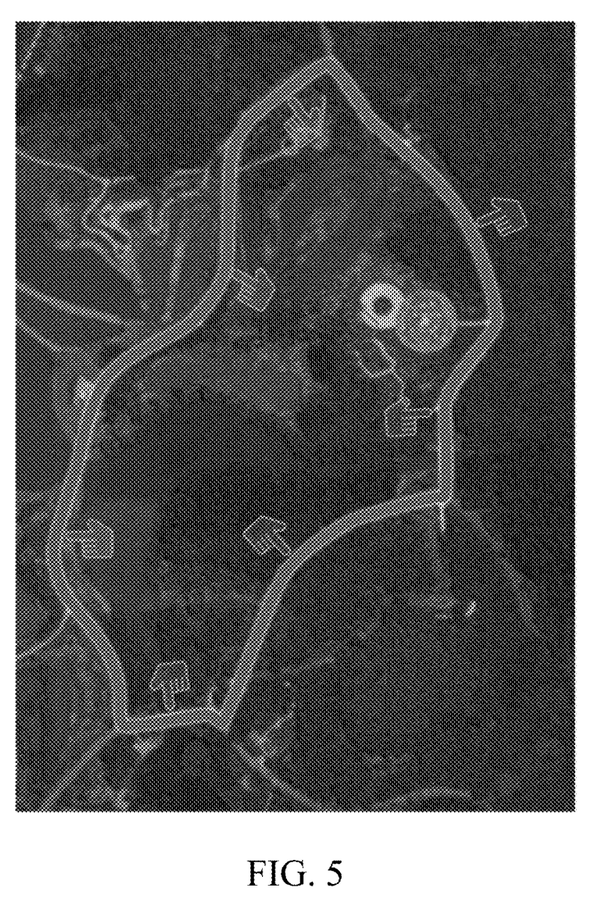
FIG. 5 a schematic drawing illustrating an adjusted trajectory diagram based on manual input according to an embodiment of the present disclosure.

The optimized trajectory diagram generated by the processor may be presented in a display device. In one embodiment, the display device and the processor are both coupled to or included in the ranging apparatus, and the processor disposed in the ranging apparatus may send the optimized trajectory diagram to the display device to be presented to a user at a time when the optimized trajectory diagram is generated or when a user command of viewing a trajectory is received (e.g., on a touchscreen of the display device). In another embodiment, the display device may be a device external to the ranging apparatus and the processor is disposed in the ranging apparatus, and after the ranging apparatus has completed a measuring session, the display device may be connected to the ranging apparatus and receive the optimized trajectory diagram from the processor disposed in the ranging apparatus for display. In yet another embodiment, the display device and the processor are both included in the terminal device. FIGS. 4-5 illustrate example trajectories presented by the display device.

Through this communication modules, the terminal device 3 may receive distance information from the electronic counter. The terminal device may further receive angle information from the angle sensor. The data processing unit may perform calculation based on the distance information and the angle information to create, in real time, a traveling trajectory diagram that illustrates a trajectory the measuring wheel has traveled. The terminal device may display the traveling trajectory diagram on a display screen of the terminal device.

The ranging system may combine the application of an electronic counter and an angle sensor to generate a drawing of the traveling trajectory, in real time, by a processor disposed in the terminal device or in the ranging apparatus based on the data measured by the ranging apparatus and the angle sensor. This approach does not only achieve distance measurement, but also generates the diagram of the traveling trajectory in real time. There is no need to perform ranging segment by segment, and create the trajectory diagram in a post-processing step. Thus, work efficiency of the ranging system is effectively improved.

In certain embodiments, the ranging system may also be used to mark lines or points in a real physical scene, such as on a field or in a construction site. For example, the ranging system may include one or more markers. The marker may be connected to the rotating shaft so that the user may activate the markers to mark points or lines on the traveling route of the measuring wheel on a field or a contraction site. The activation of the markers may be performed by the processor disposed in the ranging apparatus or in the terminal device.

In certain embodiments, the ranging system may be configured to further measure altitude or height information, and display the altitude or height information of one or more sampling points. In certain embodiments, the measuring wheel may be equipped with an altitude sensor. In certain embodiments, a gravity accelerometer configured in the measuring wheel device or in the terminal device may detect a tilt angle when the measuring wheel is pushed, so a height at a sampling point may be calculated according to the tilt angle and a traveled distance that has been traveled after the tilt angle changes. The height H may be calculated according to the tilt angle $\alpha$ and the traveled distance D based on trigonometry calculation. The above calculation may be implemented by the data processing unit (i.e., processor) of the ranging system. In certain embodiments, the altitude or height information may be acquired by the terminal device using an augmented reality (AR) function available on certain smart devices. In certain embodiments, altitude or height information may be acquired by two or more methods describe above, and an average value may be calculated to improve measurement accuracy.

Although FIG. 2 show the configuration in which the terminal device 3 is fixed on the ranging apparatus via the holder, the present disclosure is not limited thereto. Instead, the terminal device does not have to be fixed on the ranging apparatus to obtain distance information and angle information by the way of wireless communication by using the wireless communication module disposed in the ranging apparatus and the terminal device. The wireless communication module may be implemented with Bluetooth, WIFI, Zigbee or RF protocols.

A storage medium may be used to store distance information, angle information and/or the traveling trajectory diagrams generated by the processor. The stored information may be retrieved later.

The ranging system according to the present disclosure may further comprise a cloud server. The processor of the ranging system and the cloud server may be connected to Internet. The cloud server may be used for storing and sharing the data sent by the processor of the ranging system. The data may include: distance information from the electronic counter, angle information from the angle sensor, and/or the generated traveling trajectory diagram. Further, the processor of the ranging system may obtain predesigned traveling trajectory diagram from the cloud server. In this manner, the stored data may be retrieved in real time and the testing data or diagram may be shared with other engineering staff to effectively improve the work quality and efficiency. In certain embodiments, the traveling trajectory generated by the processor of the ranging system and uploaded to the cloud server may be the predesigned traveling trajectory diagram to be obtained.

In certain embodiments, the processor of the ranging system may generate a trajectory diagram by connecting a plurality of sampling points, each sampling point being define by distance and angle data obtained from the electronic counter and the angle sensor. A starting point of the trajectory diagram may be selected by a user or from a pre-configured position, such as a center point of the display screen. In certain embodiments, during or after the generation of the trajectory diagram, the processor may perform further processing to optimize the trajectory.

It can be understood that the trajectory to be processed can be obtained from any suitable means or devices other than the example ranging system shown in FIG. 2, such as trajectory data extracted from an electronic map, trajectory data collected by other measurement equipment (e.g., laser, lidar, camera, etc.), trajectory data based on manual drawing or engineering drawing, etc. The trajectory data may include 2D and/or 3D information of a corresponding space. There may be multiple trajectory diagrams to be processed and each diagram may be obtained from the same or different means. In an example embodiment, one trajectory diagram may refer to a plurality of sample points that can form a continuous boundary of certain space. In some cases, the trajectory diagram may be a closed diagram. In other cases, the trajectory diagram may be combined with one or more other trajectory diagrams to form a closed diagram.

Figure 3:
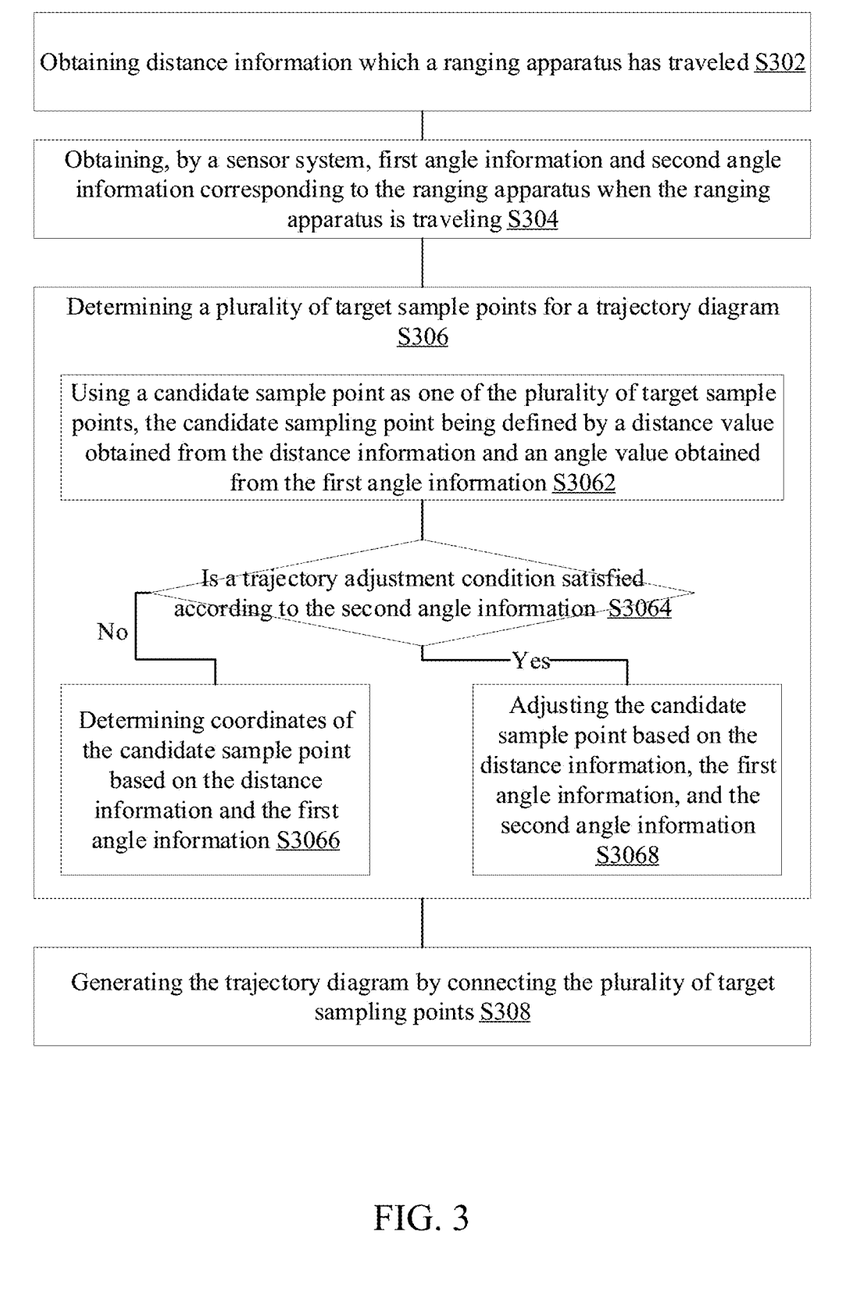
FIG. 3 is a flow chart of a trajectory generation procedure according to some embodiments of the present disclosure.

FIG. 3 is a flow chart of a trajectory generation procedure S300 according to some embodiments of the present disclosure. The trajectory processing procedure S300 may be implemented by a trajectory processing apparatus, such as the computing system 100.

As shown in FIG. 3, the process S300 may include obtaining distance information which a ranging apparatus has traveled (S302). The ranging apparatus may be a measuring wheel or any other suitable device capable of traveling and collecting distance information.

Further, a sensor system coupled to the ranging apparatus may obtain angle information corresponding to the ranging apparatus as the ranging apparatus is traveling (S304). The angle information may be collected by, for example, an accelerometer, an inertial measurement unit (IMU), a magnetometer, a gyroscope, a global positioning sensor (GPS), etc. The angle information may include first angle information and second angle information. The first angle information refers to angle information obtained by a first sensor of the sensor system, and the second angle information refers to angle information obtained by a second sensor of the sensor system. The first sensor may include gyroscope(s), magnetometer(s) and/or accelerometer(s), etc. The second sensor may include gyroscope(s), magnetometer(s) and/or accelerometer(s), etc.

A plurality of target sample points can be determined for a trajectory diagram (S306) based on the distance information and the angle information. Candidate sample points collected by the ranging apparatus may be directly used and/or adjusted to form target sample points. The trajectory diagram can be generated by connecting the plurality of target sample points (S308). In one embodiment, the computing system can connect one or more of target sample points as they become available (e.g., in real time) to generate the trajectory diagram segment by segment (e.g., when the ranging apparatus is traveling). In another embodiment, the computing system can connect the target sample points after candidate sample points corresponding to the trajectory diagram are all processed and revised. In yet another embodiment, a candidate trajectory diagram can be generated and further revised based on the distance information, the angle information, and/or user interaction.

In some embodiments, step S306 may further include using a candidate sample point as one of the plurality of target sample points (S3062). The candidate sample point is defined by a distance value obtained from the distance information and an angle value obtained from the first angle information. For example, the distance value $d_i$ of a current candidate sample point i may indicate a distance between the current candidate sample point i and an immediately preceding sample point i−1 whose coordinates can be represented by $(x_{i-1}, y_{i-1})$. The angle value $\theta_i$ may be obtained from a gyroscope. The coordinates of the current sample point may be obtained as $(x_i, y_i) = (x_{i-1} + d_i \times \cos\theta_i, y_{i-1} + d_i \times \sin\theta_i)$.

Further, the second angle information is evaluated to determine whether a trajectory adjustment condition is satisfied (S3064). The trajectory adjustment condition may include at least one of a first trajectory adjustment condition and a second trajectory adjustment condition. The first trajectory adjustment condition includes a difference between a first change rate of the first angle information and a second change rate of the second angle information being greater than a first rate threshold. The first angle information and the second angle information corresponding to the same sample point may theoretically be the same or similar. In practical scenario, the first angle information (e.g., from a gyroscope) may become less accurate during the measuring process, and the second angle information (e.g., from a magnetometer) may be used to evaluate the accuracy of the first angle information and/or compensate the error of the first angle information.

In response to the first trajectory adjustment condition being not satisfied, the coordinates of the candidate sample point can be determined based on the distance information and the first angle information (S3066). For example, as previously described, the coordinates of the current sample point may be $(x_i, y_i) = (x_{i-1} + d_i \times \cos\theta_i, y_{i-1} + d_i \times \sin\theta_i)$.

In response to the first trajectory adjustment condition being satisfied, the coordinates of the candidate sample point can be determined based on the distance information, the first angle information, and the second angle information (S3068). In one embodiment, step S3068 may include: adjusting an angle value indicated by the first angle information based on the second angle information, to obtain an adjusted angle value; and determining adjusted coordinates of the candidate sample point based on a distance value indicated by the distance information, the adjusted angle value, and coordinates of a preceding target sample point. For example, the change amount of gyroscope data Δ can be adjusted according to the change trend of magnetometer data, that is, $\theta_i$ is adjusted as $\theta_i'$. Accordingly, the coordinates of the current sample point may be $(x_i, y_i) = (x_{i-1} + d_i \times \cos\theta_i', y_{i-1} + d_i \times \sin\theta_i')$.

In some embodiments, the change amount of gyroscope data can be determined based on the following manner. At a current moment, a predicted value of gyroscope data of the current moment is denoted as $\theta_{pgi}$, and a predicted value of magnetometer data of the current moment is denoted as $\theta_{pmi}$. The values of the gyroscope data and the magnetometer data may be predicted based on previously collected data and a suitable prediction algorithm (e.g., Kalman filter). A measured (true) value of a gyroscope data of the current moment is denoted as $\theta_{tgi}$, and a measured value of magnetometer data of the current moment is denoted as $\theta_{tmi}$. The discrepancies between the predicted value and the measured value of the gyroscope data and the magnetometer data are respectively determined as $(\theta_{pgi} - \theta_{tgi})$ and $d\theta_{pmi} - \theta_{tmi})$. When both discrepancies are within a threshold T1, the prediction algorithm is considered as reliable, the measurement of the magnetometer is also considered as reliable (that is, there is no strong magnetic interference around). In this case, it is determined that the change amount of gyroscope data Δ can be adjusted according to the change trend of magnetometer data. For example, the angle values of the magnetometer at the current moment and a preceding moment are respectively denoted as $\theta_{mi}$ and $\theta_{mi-1}$, the angle values of the gyroscope at the current moment and the preceding moment respectively denoted as $\theta_{gi}$ and $\theta_{gi-1}$. The adjusted angle value of the gyroscope at the current moment denoted as $\theta_i' = \theta_{gi-1} + \Delta\theta_i$, where $\Delta\theta_i = \theta_{mi} - \theta_{mi-1}$. In some embodiments, when both discrepancies $(\theta_{pgi} - \theta_{tgi})$ and $d\theta_{pmi} - \theta_{tmi})$ are within a threshold T1, the process may further include determining whether a change value of the gyroscope data (e.g., $\theta_{gi} - \theta_{gi-1}$) is abnormal, and when it is determined that the change value of the gyroscope data is abnormal, the process moves on to the step of adjusting the change amount of the gyroscope data according to the change trend of the magnetometer data. Determining the change value of the gyroscope data being abnormal may include determining whether the change value of the gyroscope data is greater than a threshold T2, or whether the change value of the gyroscope data is greater than a ratio (e.g., 120%) of a change value of the magnetometer data $\theta_{mi} - \theta_{mi-1}$. In some embodiments, at other occasions, such as when just one of or none of the discrepancies $(\theta_{pgi} - \theta_{tgi})$ and $d\theta_{pmi} - \theta_{tmi})$ is within the threshold T1, or when both of the discrepancies is within the threshold T1 but the gyroscope data is not determined as abnormal, the gyroscope data may be directly used without adjustment based on the magnetometer data.

In some embodiments, abnormal data samples (e.g., data points corresponding to abrupt changes) can be removed, to improve accuracy of the trajectory diagram. For example, the first angle information corresponding to the ranging apparatus includes a current angle value corresponding to a current time stamp obtained by an angle sensor of the sensor system; and the second angle information corresponding to the to the ranging apparatus includes a plurality of angle values corresponding to a time period obtained by the angle sensor of the sensor system. In some examples, the time period has a preset length and ends at the current time stamp. In some examples, the time period is the length of n pulse signals returned by the ranging apparatus. The second trajectory adjustment condition includes that the plurality of angle values in the second angle information include an oscillatory pattern and an average absolute value of the plurality of angle values is greater than an angle value threshold. The oscillatory pattern refers to a pattern that the angle values are oscillating/alternating between negative values and positive values. For example, the angle value threshold is 5, when the second angle information include angle values −3, 4, 2, 5, −1, −3, the second trajectory adjustment condition is not satisfied; when the second angle information include angle values −6, 4, 8, −7, −6, 5, the second trajectory adjustment condition is satisfied.

In response to the second trajectory adjustment condition being not satisfied, the coordinates of the candidate sample point can be determined based on the distance information and the first angle information (S3066). For example, as previously described, the coordinates of the current sample point may be $(x_i, y_i) = (x_{i-1} + d_i \times \cos\theta_i, y_{i-1} + d_i \times \sin\theta_i)$.

In response to the second trajectory adjustment condition being satisfied, the coordinates of the candidate sample point can be determined based on the distance information, the first angle information, and the second angle information (S3068). In one embodiment, step S3068 may include: removing one or more candidate sample points corresponding to the time period from the plurality of target sample points. In the above example, when the second angle information include angle values −6, 4, 8, −7, −6, 5, the second trajectory adjustment condition is satisfied, and the sample points related to angle values −6, 4, 8, −7, −6, 5 are removed.

Further, as the error of the first angle information from the gyroscope accumulates during the measuring process, a reset of the gyroscope may be performed to remove cumulated error. In one embodiment, a change rate of the data from the gyroscope being significantly greater than a change rate of the data from the magnetometer may indicate a proper timing to reset the gyroscope. For example, the trajectory adjustment condition includes a third condition, and the third condition includes that the difference between the first change rate of the first angle information and the second change rate of the second angle information being greater than a second rate threshold, and an accumulated time has reached a time threshold. In this example, step S3068 may include: restarting the first sensor to clear accumulated errors of the first sensor; obtaining the first angle information after restarting the first sensor, the first angle information comprises a current angle value corresponding to a current time stamp; and determining adjusted coordinates of the candidate sample point based on a distance value indicated by the distance information, the current angle value, and coordinates of a preceding target sample point.

In another embodiment, the ranging apparatus having significantly slowed down or reaching a stop may indicate a proper timing to reset the gyroscope. For example, the trajectory adjustment condition includes a fourth condition, and the fourth condition includes that a velocity of the ranging apparatus being lower than a velocity threshold. The velocity may be obtained based on the second angle information and the distance information. In this example, step S3068 may include: restarting the first sensor to clear accumulated errors of the first sensor; obtaining the first angle information after restarting the first sensor, the first angle information comprises a current angle value corresponding to a current time stamp; and determining adjusted coordinates of the candidate sample point based on a distance value indicated by the distance information, the current angle value, and coordinates of a preceding target sample point.

It can be understood that although data from gyroscope is used as the first angle information in sample embodiments, in other embodiments, data from other sensor(s) can be used as the first angle information, and/or data from the gyroscope can be used as the second angle information.

Steps S3062 through S3068 may be repeated for some or all candidate sample points to determine the plurality of target sample points for a trajectory diagram. The plurality of target sample points can be connected to generate the trajectory diagram (S308).

In some embodiments, an initial trajectory diagram of a space generated based on measurement data from the ranging apparatus may be adjusted based on a reference input corresponding to the space. The reference input may include, for example, a real scene background image, a user manual input, map data (e.g., GPS data), etc. The reference input can improve accuracy of the initial trajectory. For example, some target sample points in the initial trajectory diagram may be determined based on data collected by the ranging apparatus in a low battery status. In a low battery status, the accuracy of gyroscope may decrease, which may cause error in the initial trajectory diagram.

FIG. 4 is a schematic drawing illustrating an adjustment of a trajectory diagram based on reference input according to an embodiment of the present disclosure. As shown in FIG. 4, the shadow area surrounded by a dashed line indicates an actual physical area that the ranging apparatus has measured. The solid line indicates an initial trajectory diagram generated based on the data from the ranging apparatus. The solid circle 402 indicates a starting point of the ranging process. The hollow circles 404a through 404e indicate feature sample points determined based on the data of the ranging apparatus. The triangles 406a through 406e indicates updated feature sample points respectively corresponding to points 404a through 404e after adjustments performed based on the reference input. When the trajectory diagram is a closed shape, the ending target sample point 408 of the initial trajectory diagram may be adjusted to overlap with starting point 402.

The feature sample points are marked to disperse possible errors in the ranging process. The feature sample points may include point(s) manually selected by a user and/or point(s) automatically selected by the trajectory diagram generation apparatus (e.g., selecting 1 feature sample point at every 30 sample point interval). FIG. 5 a schematic drawing illustrating an adjusted trajectory diagram based on manual input according to an embodiment of the present disclosure. As shown in FIG. 5, the real-scene background image may be obtained based on map data such as GPS data, and the hand shapes indicate feature sample points adjusted by user manual inputs. In some embodiments, a local area in the background image can be enlarged, to facilitate accurate user manual adjustment.

For example, in one adjustment session, a total of m feature sample points are marked and adjusted. That is, a kth feature sample point (k is from 1 to m−1) has a set of original coordinates before adjustment and an updated set of coordinates after adjustment. For a 2D scenario, an offset of a kth feature sample point can be represented as $(x_k, y_k)$, and an offset of a (k+1)th feature sample point can be represented as $(x_{k+1}, y_{k+1})$. Accordingly, the path between the kth feature sample point and the (k+1)th feature sample point are deviated by $(x_{k+1}-x_k, y_{k+1}-y_k)$. The path may include l sample points, so for a jth sample point (j is 1 from l), the offset of the jth sample point is $(j\times(x_{k+1}-x_k)/l, j\times(y_{k+1}-y_k)/l)$. In this way, an offset for each sample point in the initial trajectory diagram can be obtained, and updated coordinates of each sample point can be obtained based on the offset and initial coordinates. By connecting the updated sample points, an updated trajectory diagram can be obtained.

In some embodiments, when a desired trajectory diagram is a closed shape but the initial trajectory diagram generated based on the measurement data of the ranging apparatus is not closed, a trajectory adjustment algorithm can be implemented to generate an updated trajectory diagram having a closed shape.

In the unclosed initial trajectory diagram, each sample point i has angle value change compared to previous sample point i−1, which can be denoted as $\Delta\theta_i$. Since the shape is not closed, an absolute value of the sum of angle value changes of all sample points SA is less than 360°, a difference between the sum SA and 360° is denoted as A (i.e., $A=360-S_A$). The trajectory adjustment algorithm may include the following steps.

Step 1, traversing angle value changes of all sample points and dividing the sample points into two groups to make the absolute value of the sum of angle value changes of sample points in each group as close to 180 as possible. The sample points in each group are consecutive sample points. Different division strategies are compared to select one division strategy with absolute value of the sum of angle value changes of sample points in each group closest to 180. For example, the initial trajectory diagram includes 50 sample points. A first division strategy is making points 1-24 as first group and points 25-50 as second group, the absolute value of the sum of angle value changes of sample points 1-24 is 70, and the absolute value of the sum of angle value changes of sample points 25-50 is 260. A second division strategy is making points 20-40 as first group and points 41-19 (i.e., 41-50 and 1-19) as second group, the absolute value of the sum of angle value changes of sample points (abbreviated as group sum hereinafter) 20-40 is 170, and the absolute value of the sum of angle value changes of sample points 41-19 is 160. In this case, the second division strategy is selected compared to the first division strategy, because the differences between the group sum of the two groups of the second division strategy and 180 (i.e., 20 and 10), which are less than the differences between the group sum of the two groups in the first division strategy (i.e., 110 and 80).

Step 2, for each of the two group obtained from step 1, traversing angle value changes of all sample points and dividing the sample points into two sub-groups to make the absolute value of the sum of angle value changes of sample points in each sub-group as close to 90 as possible. The sample points in each sub-group are consecutive sample points. A total of four sub-groups is obtained. Different division strategies are compared to select one division strategy with absolute value of the sum of angle value changes of sample points in each sub-group closest to 90. For example, a group obtained from step 1 includes sample points 20-40. A third division strategy is making points 23-32 as a first sub-group which has a group sum of 78 and points 33-22 (i.e., 33-40 and 20-22) as a second sub-group which has a group sum of 92. A fourth division strategy is making points 20-30 as a first sub-group which has a group sum of 60 and points 31-40 as a second sub-group which has a group sum of 110. In this case, the third division strategy is selected compared to the fourth division strategy, because the differences between the group sum of the two sub-groups of the third division strategy and 90 (i.e., 12 and 2), which are less than the differences between the group sum of the two sub-groups in the fourth division strategy (i.e., 30 and 20).

Step 3, assigning an angle difference for each of the four sub-groups to make the total angle difference A based on the sum of angle value changes of sample points in each sub-group. The angle difference may be proportionally assigned based on the group sum of each sub-group. For example, the total angle difference A is 30°, the group sum of the four sub-groups are respectively 10°, 20°, 5°, 15°. The assigned angle difference for each sub-group may be respectively 30*10/(10+20+5+15), 30*20/(10+20+5+15), 30*5/(10+20+5+15), and 30*15/(10+20+5+15).

Step 4, assigning angle adjustments for sample points in each sub-group based on angle values of the sample points and the assigned angle difference for the corresponding sub-group. The angle adjustment for one sample point may be proportional to the angle value of the sample point and the assigned angle difference in each sub-group. For example, one sub-group includes 4 sample points, the assigned angle difference for the sub-group is 10°, and angle values of the 4 sample points are respectively 2, −2, 1, 3. Accordingly, the sum of angle values of sample points in the sub-group is 4. The adjusted angle values of sample points with angle values 2, −2, 1, 3 are respectively: 2*10/4+2=7, (−2)*10/4+(−2)=−7, 1*10/4+1=3.5, 3*10/4+3=10.5. In some embodiments, when a sample point corresponds to an angle difference lower than a preset threshold, the angle of the sample point is not adjusted.

Step 5, updating coordinates of the sample points based on the assigned angle adjustments, and updating the trajectory diagram based on the updated coordinates of the sample points.

In some embodiments, the initial trajectory diagram of a space can be updated during a ranging process (e.g., in real time) based on the reference input corresponding to the space. For example, a top view image and scale of a space to be surveyed can be obtained from an external resource (e.g., satellite map data). An image recognition algorithm can be performed (e.g., by using OpenCV) on the top view image to identify a path in the space to be surveyed. An outline of the path is obtained and includes coordinates of a set of path points representing the path. The set of path points are points in the two-dimensional array of pixels of the top view image. The sample points obtained based on data from the ranging apparatus can be rendered on the same top view image. The displayed sample points may be manually adjusted by a user so that the generated trajectory diagram can fit better with the path in the top view image. Specifically, a starting point may be manually selected by a user on the top view image, coordinates of the start point may be denoted as (x0, y0) and can be used as the origin point (0, 0) of the trajectory diagram. A conversion relationship between the pixel distance and the actual distance can be calculated based on pixel width of the top view image and the scale of the top view image. Coordinates of a current sample point $(x_i, y_i)$ can be determined as follows: determining a circle by using coordinates of a preceding sample point $(x_{i-1}, y_{i-1})$ as center, and a unit distance of the ranging apparatus as radius (e.g., a distance traveled by a measuring wheel in between two neighboring pulse signals); removing path points within the circle and determining a path point that intersects with the circle as the current sample point. When multiple path points intersect with the circle, the path point corresponding to the smallest included angle (an angle between a line that extends from previous preceding point $(x_{i-2}, y_{i-2})$ to the preceding sample point $(x_{i-1}, y_{i-1})$ and a line connecting the path point and the preceding sample point $(x_{i-1}, y_{i-1})$) is identified as the current sample point. Further, a direction of the current sample point can be calculated based on coordinates of the current sample point and its preceding sample point. When the calculated direction is not consistent with the direction indicated by an angle sensor (e.g., a magnetometer), a graphical user interface on the user device showing real-time picture of the current scene (e.g., for augmented reality navigation instruction) may be updated to reminder user about the deviated direction, such as showing a text "please turn to the right for 5 degrees to stay on the designated path," showing an arrow picture pointing to the right and a desired adjusting angle value, etc.

Figure 6:
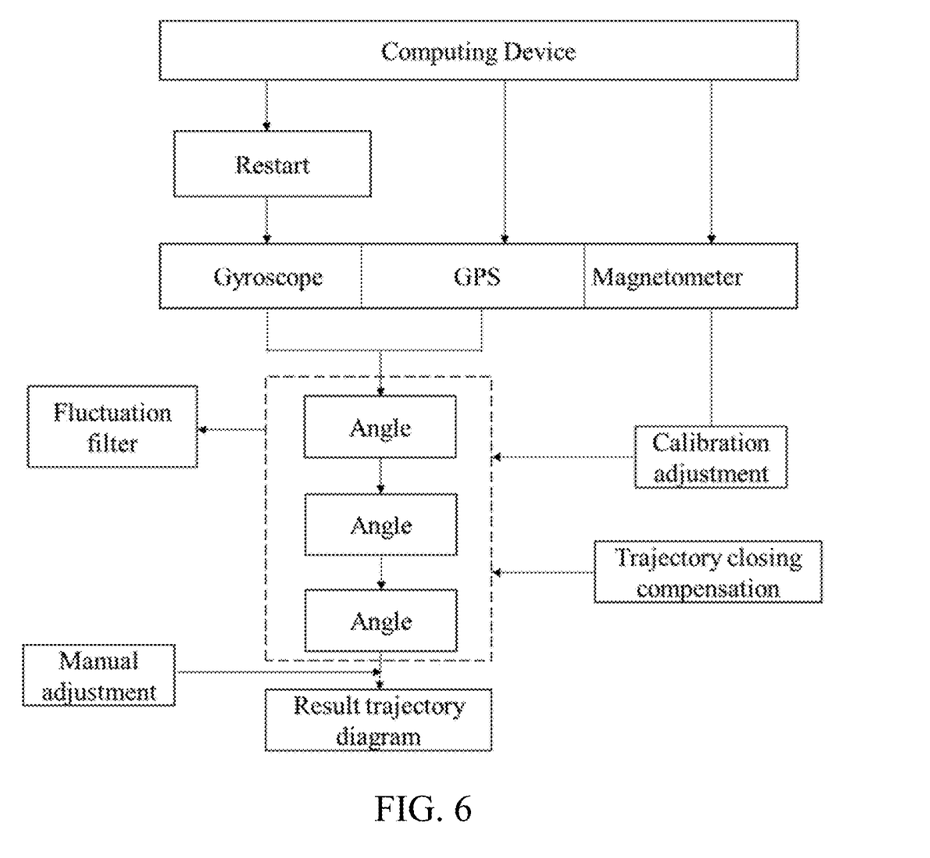
FIG. 6 is a schematic diagram of an example trajectory generation procedure and related components according to some embodiments of the present disclosure.

FIG. 6 is a schematic diagram of an example trajectory generation procedure and related components according to some embodiments of the present disclosure. As shown in FIG. 6, the computing device may be a processor of the ranging apparatus or a user device in communication with the ranging apparatus. The sensor system coupled to the ranging apparatus may include: gyroscope, GPS, and magnetometer. The computing device can determine whether to restart the gyroscope and eliminate drift error (e.g., periodically or based on data from the magnetometer and/or GPS). Detailed description for restarting can be found in previously described embodiments. The calibration and compensation of the angle data can be performed based on data from the magnetometer. Detailed description can be found in previously described embodiments related to trajectory adjustment condition. The fluctuation filter is applied to remove abnormal sample points and points having abrupt changes. The manual adjustment can be used as a reference input to update the trajectory diagram generated based on sample points, to provide an updated trajectory diagram with improved accuracy.

The present disclosure further provides a trajectory generation apparatus based on the foregoing trajectory generation method. The trajectory generation apparatus may perform one or more operations in the foregoing description, and the specific details are not repeated.

Accordingly, the present disclosure provides a trajectory generation method and apparatus for generating a trajectory diagram based on measurement data from a traveling ranging apparatus. A processor of the trajectory generation apparatus may adjust coordinates of sample points collected by the ranging apparatus based on angle information of two sensors and/or reference input, to generate a high-accuracy, optimized trajectory diagram. The trajectory generation apparatus may further mark an actual scene such with marking lines or marking points for a predetermined traveling trajectory on a predesigned drawing, and may prompt direction and distance information to a user. The ranging apparatus may also be provided with a camera, and the processor may be configured to combine information recorded by the camera with the trajectory diagram to guide route correction in the real scene. Compared to existing ranging devices, work efficiency and accuracy in ranging and trajectory generation applications can be improved.

The method and apparatus provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

What is claimed is:

1. A trajectory generation method, comprising:
obtaining distance information which a ranging apparatus has traveled;
obtaining, from a sensor system, first angle information and second angle information corresponding to the ranging apparatus when the ranging apparatus is traveling in a space;
determining a plurality of target sample points for a trajectory diagram of the space, comprising:
using a candidate sample point as one of the plurality of target sample points, the candidate sampling point being defined by a distance value obtained from the distance information and an angle value obtained from the first angle information;
determining whether a trajectory adjustment condition is satisfied, wherein the trajectory adjustment condition includes at least one of a first trajectory adjustment condition or a second trajectory adjustment condition, the first trajectory adjustment condition is based on a first change rate of the first angle information and a second change rate of the second angle information, and the second trajectory adjustment condition is based on a plurality of angle values in the second angle information:
in response to the trajectory adjustment condition not being satisfied, determining coordinates of the candidate sample point based on the distance information and the first angle information; and
in response to the trajectory adjustment condition being satisfied, adjusting the candidate sample point based on the distance information, the first angle information, and the second angle information; and
generating the trajectory diagram by connecting the plurality of target sampling points.

2. The method according to claim 1, wherein:
the first angle information corresponding to the ranging apparatus is obtained by a first sensor of the sensor system; and
the second angle information corresponding to the ranging apparatus comprises information obtained by a second sensor of the sensor system.

3. The method according to claim 2, wherein:
the first sensor is at least one of a gyroscope, an accelerometer, or a magnetometer; and
the second sensor is at least one of a gyroscope, an accelerometer, or a magnetometer.

4. The method according to claim 2, wherein the first trajectory adjustment condition comprises a difference between the first change rate of the first angle information and the second change rate of the second angle information being greater than a first rate threshold.

5. The method according to claim 4, wherein in response to determining that the trajectory adjustment condition is satisfied, adjusting the candidate sample point based on the distance information, the first angle information, and the second angle information comprises:
   adjusting an angle value indicated by the first angle information based on the second angle information, to obtain an adjusted angle value; and
   determining adjusted coordinates of the candidate sample point based on a distance value indicated by the distance information, the adjusted angle value, and coordinates of a preceding target sample point.

6. The method according to claim 1, wherein:
the first angle information corresponding to the ranging apparatus comprises a current angle value corresponding to a current time stamp obtained by an angle sensor of the sensor system; and
the second angle information corresponding to the ranging apparatus comprises the plurality of angle values corresponding to a time period obtained by the angle sensor of the sensor system.

7. The method according to claim 6, wherein the time period has a preset length and ends at the current time stamp.

8. The method according to claim 6, wherein the second trajectory adjustment condition comprises the plurality of angle values in the second angle information include an oscillatory pattern and an average absolute value of the plurality of angle values is greater than an angle value threshold.

9. The method according to claim 8, wherein in response to determining that the trajectory adjustment condition is satisfied, adjusting the candidate sample point based on the distance information, the first angle information, and the second angle information comprises:
   in response to determining that the second trajectory adjustment condition is satisfied, removing one or more candidate sample points corresponding to the time period from the plurality of target sample points.

10. The method according to claim 2, wherein:
the trajectory adjustment condition comprises the difference between the first change rate of the first angle information and the second change rate of the second angle information being greater than a second rate threshold, and an accumulated time has reached a time threshold.

11. The method according to claim 10, wherein in response to determining that the trajectory adjustment condition is satisfied, adjusting the candidate sample point based on the distance information, the first angle information, and the second angle information comprises:
   restarting the first sensor to clear accumulated errors of the first sensor;
   obtaining the first angle information after restarting the first sensor, the first angle information comprises a current angle value corresponding to a current time stamp; and
   determining adjusted coordinates of the candidate sample point based on a distance value indicated by the distance information, the current angle value, and coordinates of a preceding target sample point.

12. The method according to claim 6, wherein:
the method further comprises: determining a velocity of the ranging apparatus based on the second angle information and the distance information; and
the trajectory adjustment condition comprises the velocity of the ranging apparatus being lower than a velocity threshold.

13. The method according to claim 12, wherein in response to determining that the trajectory adjustment condition is satisfied, adjusting the candidate sample point based on the distance information, the first angle information, and the second angle information comprises:
   restarting the first sensor to clear accumulated errors of the first sensor;
   obtaining the first angle information after restarting the first sensor, the first angle information comprises a current angle value corresponding to a current time stamp; and
   determining adjusted coordinates of the candidate sample point based on a distance value indicated by the distance information, the current angle value, and coordinates of a preceding target sample point.

14. The method according to claim 1, further comprising:
updating coordinates of one or more of the target sample points based on a reference input; and
updating the trajectory diagram based on the updated target sample points.

15. The method according to claim 14, wherein the reference input includes a user manual input on one of the target sample points.

16. A trajectory generation apparatus, comprising: at least one memory storing a computer program and at least one processor coupled to the at least one memory, the at least one processor is configured to execute the computer program and perform:
   obtaining distance information which a ranging apparatus has traveled;
obtaining, from a sensor system, first angle information and second angle information corresponding to the ranging apparatus when the ranging apparatus is traveling in a space;
   determining a plurality of target sample points for a trajectory diagram of the space, comprising:
      using a candidate sample point as one of the plurality of target sample points, the candidate sampling point being defined by a distance value obtained from the distance information and an angle value obtained from the first angle information;
      determining whether a trajectory adjustment condition is satisfied, wherein the trajectory adjustment condition includes at least one of a first trajectory adjustment condition or a second trajectory adjustment condition, the first trajectory adjustment condition is based on a first change rate of the first angle information and a second change rate of the second angle information, and the second trajectory adjustment condition is based on a plurality of angle values in the second angle information;
      in response to the trajectory adjustment condition not being satisfied, determining coordinates of the candidate sample point based on the distance information and the first angle information; and
      in response to the trajectory adjustment condition being satisfied, adjusting the candidate sample point based on the distance information, the first angle information, and the second angle information; and
   generating the trajectory diagram by connecting the plurality of target sampling points.

17. The apparatus according to claim 16, wherein:
the first angle information corresponding to the ranging apparatus is obtained by a first sensor of the sensor system; and
the second angle information corresponding to the ranging apparatus comprises information obtained by a second sensor of the sensor system.

18. The apparatus according to claim 17, wherein:
the first sensor is at least one of a gyroscope, an accelerometer, or a magnetometer; and
the second sensor is at least one of a gyroscope, an accelerometer, or a magnetometer.

19. The apparatus according to claim 17, wherein the first trajectory adjustment condition comprises a difference between the first change rate of the first angle information and the second change rate of the second angle information being greater than a first rate threshold.

20. The apparatus according to claim 19, wherein in response to determining that the trajectory adjustment condition is satisfied, adjusting the candidate sample point based on the distance information, the first angle information, and the second angle information comprises:
adjusting an angle value indicated by the first angle information based on the second angle information, to obtain an adjusted angle value; and
determining adjusted coordinates of the candidate sample point based on a distance value indicated by the distance information, the adjusted angle value, and coordinates of a preceding target sample point.

* * * * *